US012040133B2

(12) United States Patent
Yoshida et al.

(10) Patent No.: US 12,040,133 B2
(45) Date of Patent: Jul. 16, 2024

(54) ELECTRONIC APPARATUS

(71) Applicant: CANON KABUSHIKI KAISHA, Tokyo (JP)

(72) Inventors: Takashi Yoshida, Kanagawa (JP); Hideki Dobashi, Kanagawa (JP); Shinsaku Watanabe, Kanagawa (JP); Shingo Iwatani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 17/356,811

(22) Filed: Jun. 24, 2021

(65) Prior Publication Data

US 2021/0407719 A1 Dec. 30, 2021

(30) Foreign Application Priority Data

Jun. 29, 2020 (JP) ................................ 2020-111140

(51) Int. Cl.

*H01F 7/20* (2006.01)
*G05G 1/01* (2008.04)
*G05G 1/08* (2006.01)
*G05G 5/03* (2008.04)

(52) U.S. Cl.

CPC ................ *H01F 7/20* (2013.01); *G05G 1/01* (2013.01); *G05G 1/08* (2013.01); *G05G 5/03* (2013.01); *G05G 2505/00* (2013.01)

(58) Field of Classification Search

CPC ............... G05G 1/08; G05G 1/10; H01H 3/08
See application file for complete search history.

(56) References Cited

U.S. PATENT DOCUMENTS

2019/0317544 A1* 10/2019 Ravedati .................. G05G 5/03
2021/0026394 A1* 1/2021 Kuroki .................. G05G 5/065
2022/0134884 A1* 5/2022 Chung ................ B60H 1/0065 345/184

FOREIGN PATENT DOCUMENTS

DE 102018222844 B3 * 4/2020
FR 3064377 A1 * 9/2018 ............ B60K 37/06
JP 2017-167603 A 9/2017

OTHER PUBLICATIONS

USPTO Machine Translation (retrieved from FIT database) of the Description of FR 3064377 A1, Tissot, Sep. 28, 2018. (Year: 2023).*

* cited by examiner

*Primary Examiner* — Daniel D Yabut
(74) *Attorney, Agent, or Firm* — Cowan, Liebowitz & Latman, P.C.

(57) ABSTRACT

An electronic apparatus includes a control apparatus having a main body, a rotatable member rotatably supported by the main body, a magneto rheological fluid provided between the main body and the rotatable member, and a magnetic field generator configured to apply a magnetic field to the magneto rheological fluid, a plurality of rotatable operation members, and an operational feeling transmitter configured to transmit an operational feeling of the control apparatus to the plurality of rotatable operation members. When a switching member changes a transmission state of the operational feeling transmitter, a rotatable operation member to be used is selected from the plurality of rotatable operation members.

10 Claims, 9 Drawing Sheets

ELECTRONIC APPARATUS

BACKGROUND OF THE INVENTION

Field of the Invention

The present disclosure relates to an electronic apparatus.

Description of the Related Art

In recent years, both reduction of size and improvement in quality have been required to electronic apparatuses such as digital cameras. An electronic apparatus includes an operation member such as a dial and a slide lever for changing a mode and a setting parameter. There is a rotatable operation member such as a dial including a sliding portion using an elastic member such as rubber or highly viscous grease, so as to moderately increase rotational torque of the operation member, and to be rotated with a comfortable feeling. There is also a rotatable operation member including a click structure that uses a spring or the like, so as to provide one click feeling for each time when a setting parameter is changed by one. Further, there is an electronic apparatus including a plurality of dials, and depending on an application of each dial, rotational torque is increased or decreased, a click feeling is increased or decreased, and a click pitch is increased or decreased, so that operational feelings are optimized and that good operational feelings are provided. Each of them has been devised for improving the operational feeling of the operation member, and for improving the quality.

As an apparatus that controls an operational feeling of such operation members, an operational feeling control apparatus using an MR fluid (magneto rheological fluid) has been proposed. The MR fluid is a fluid in which ferromagnetic particles such as iron having diameters of about 1 to 10 μm are dispersed in a solvent such as oil. The MR fluid has a characteristic that when a magnetic field is applied to this fluid, the ferromagnetic particles are connected in a chain, and viscosity of the MR fluid increases. The MR fluid has a further characteristic that the viscosity increases as the magnetic field becomes stronger, and thus it is possible to control the viscosity of the MR fluid by controlling the strength of the magnetic field.

A well-known configuration as an operational feeling control apparatus using the MR fluid is to fill a space around a rotatable member, that is a rotor, with the MR fluid and dispose a coil for generating a magnetic field in the vicinity of the space. When a current flowing through the coil is changed, the magnetic field applied to the MR fluid is changed, and the viscosity of the MR fluid is changed. Thereby, rotational torque of the rotatable member is changed, and by connecting a rotatable operation member such as a dial to this rotatable member, a feeling of a rotational operation can be freely changed.

A device has been proposed which controls operational feelings of a plurality of operation members by arranging such an operational feeling control apparatus based on an operation on each operation member (for example, Japanese Patent Application Laid-Open No. 2017-167603).

However, when an electronic apparatus includes a plurality of rotatable operation members, if an operational feeling control apparatus using an MR fluid is disposed for each of the plurality of rotatable operation members, the electronic apparatus becomes large and the cost increases.

SUMMARY OF THE INVENTION

The present disclosure provides a low-cost and small-sized electronic apparatus including a plurality of rotatable operation members with good operational feelings by controlling the plurality of rotatable operation member with one control apparatus.

An electronic apparatus according to one aspect of the present disclosure includes a control apparatus having a main body, a rotatable member rotatably supported by the main body, a magneto rheological fluid provided between the main body and the rotatable member, and a magnetic field generator configured to apply a magnetic field to the magneto rheological fluid, a plurality of rotatable operation members, and an operational feeling transmitter configured to transmit an operational feeling of the control apparatus to the plurality of rotatable operation members. When a switching member changes a transmission state of the operational feeling transmitter, a rotatable operation member to be used is selected from the plurality of rotatable operation members.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1A:
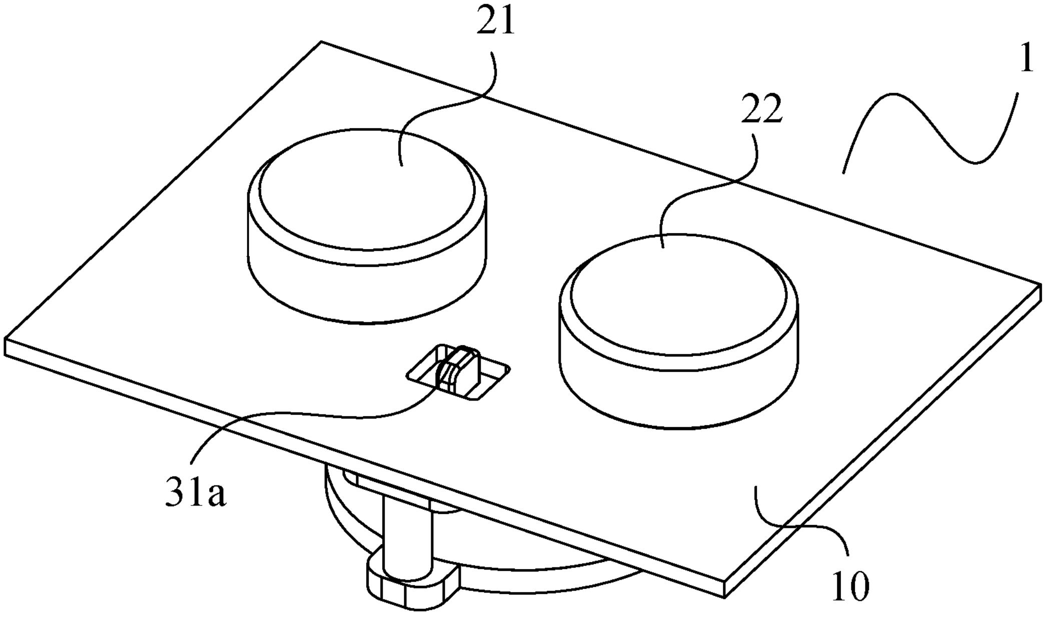
FIGS. 1A and 1B are a perspective view and a top view illustrating an operation unit of an electronic apparatus according to a first embodiment of the present disclosure.
Figure 1B:
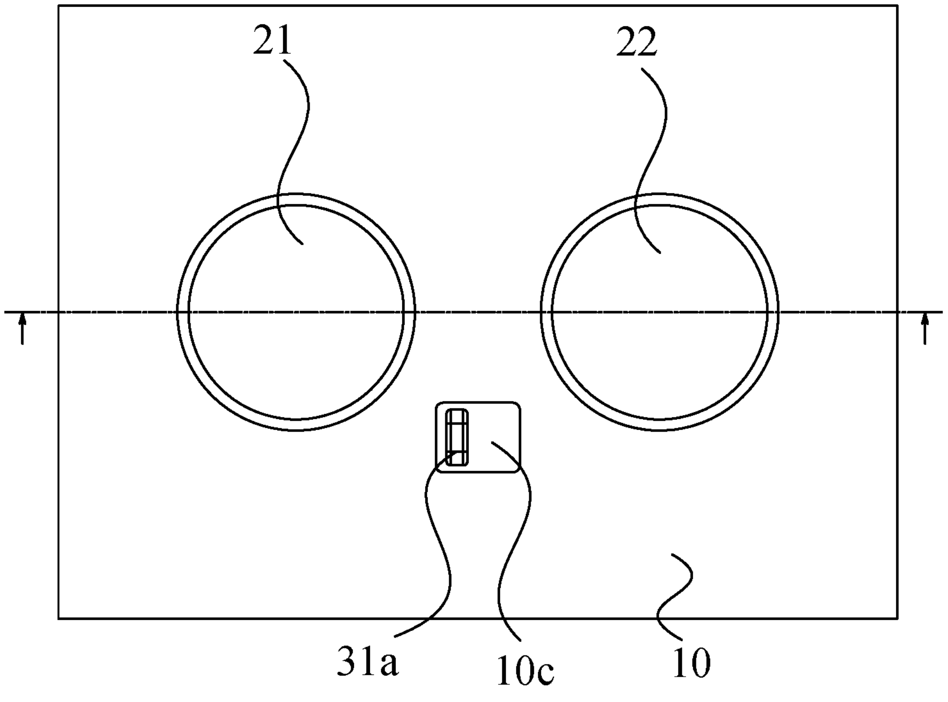

FIGS. 1A and 1B illustrate an operation unit 1 including rotatable operation members 21 and 22 of an electronic apparatus according to an embodiment of the present disclosure. FIG. 1A is a perspective view, and FIG. 1B is a top view. In this embodiment, a description will be given of a case where the operation unit 1 is disposed on an upper surface of the electronic apparatus, but in an actual electronic apparatus, the operation unit 1 may be disposed on any surface such as the other side surface or a back surface. The rotatable operation members 21 and 22 are arranged side by side on an exterior cover 10. Both rotational axes of the rotatable operation members 21 and 22 are orthogonal to the exterior cover 10. That is, the rotatable operation members 21 and 22 have the rotational axes in a same direction. Since the rotatable operation members 21 and 22 are arranged side by side, the rotational axes of the rotatable operation members 21 and 22 are not on a same axis but on different axes. That is, the rotational axes of the rotatable operation members 21 and 22 are on different axes in the same direction. Regarding the exterior cover 10, a side surface and the like are omitted in the drawings for simplicity.

Figure 2:
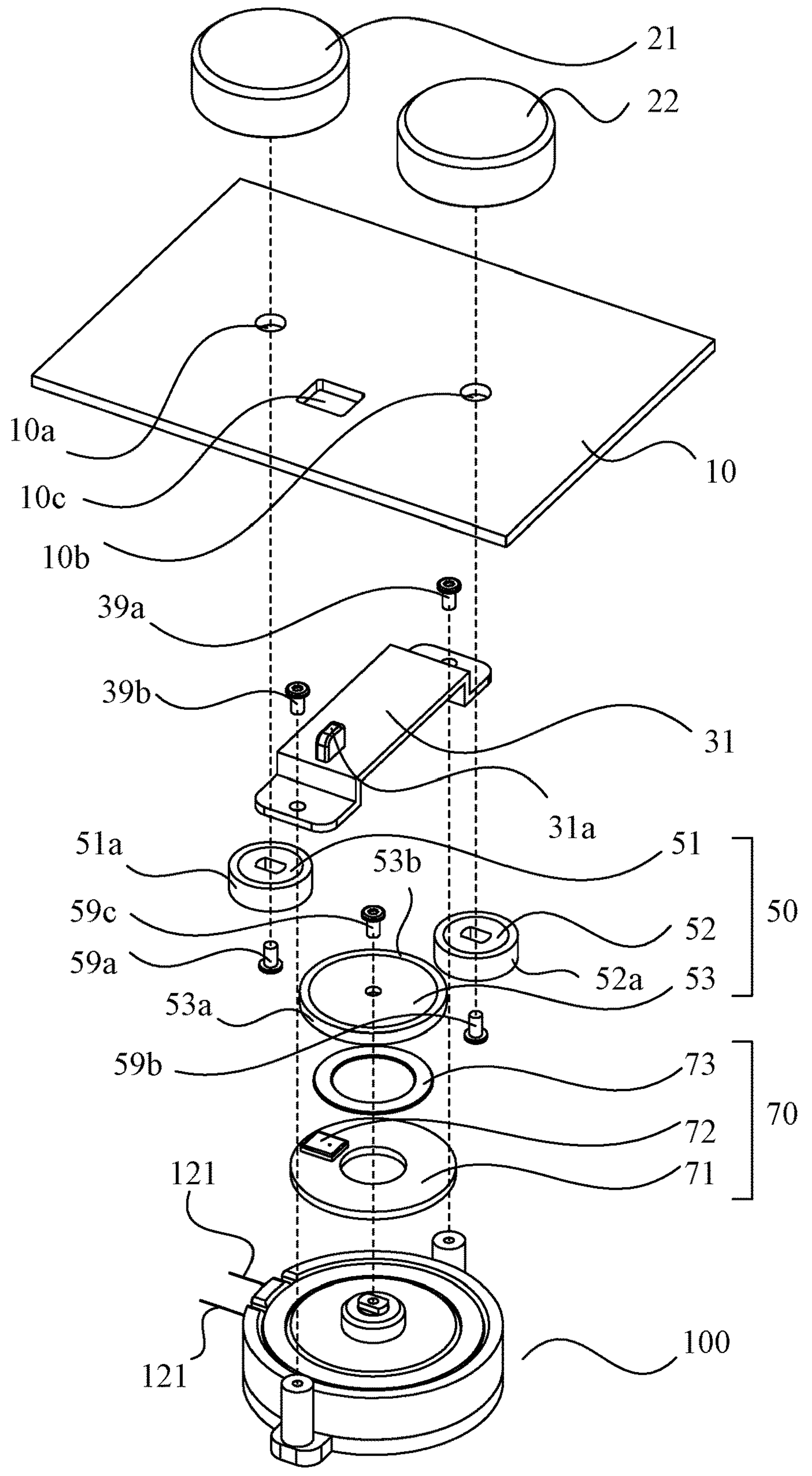
FIG. 2 is an exploded perspective view illustrating the operation unit of the electronic apparatus according to the first embodiment of the present disclosure.

FIG. 2 is an exploded perspective view illustrating the operation unit 1. A description will be given of a configuration of the operation unit 1 with reference to the drawing. First, a description will be given of a peripheral configuration of the rotatable operation members 21 and 22. Circular openings 10*a* and 10*b* are formed on the exterior cover 10. Shaft portions of the rotatable operation members 21 and 22 are inserted into the openings 10*a* and 10*b* from the outside of the exterior cover 10. From the inside of the exterior cover 10, transmission members 51 and 52 as sub transmission members are fitted to the shaft portions of the rotatable operation members 21 and 22 and are fastened with screws 59*a* and 59*b*. The transmission members 51 and 52 are integrally movable with the rotatable operation members 21 and 22, and the rotatable operation members 21 and 22 are supported rotatably for the exterior cover 10.

Next, a description will be given of a peripheral configuration of an operational feeling control apparatus 100 as a control apparatus using an MR fluid. A transmission member 53 as a main transmission member is moved integrally with and rotatably fastened, with a screw 59*c*, to a rotation shaft portion of the operational feeling control apparatus 100. A detailed description will be given later of the operational feeling control apparatus 100 and the rotation shaft portion of the operational feeling control apparatus 100 with reference to FIGS. 3A and 3B. A scale 73 is fixed to the transmission member 53 by a double-side tape or adhesive (not illustrated), and they integrally move. An electronic circuit board 71 having a light sensor 72 at a position facing the scale 73 is fixed to the main body of the operational feeling control apparatus 100.

A detector 70 includes the electronic circuit board 71, the light sensor 72, and the scale 73. Light emitted from a light emitting unit of the light sensor 72 is reflected on a pattern surface of the scale 73, and is received by a light receiving unit of the light sensor 72. By reading a difference in patterns of the scale 73 which is rotating, a rotation direction and a rotation angle, that is a rotation position, of the scale 73 can be detected. This embodiment describes a configuration which detects the rotation direction and the rotation angle of the transmission member 53 to which the scale 73 is fixed, and finally calculates a rotation direction and a rotation angle of the rotatable operation members 21 and 22 via the transmission members 51 and 52. The configuration may be a configuration that directly detects the rotation direction and the rotation angle of the transmission members 51 and 52, or of the rotatable operation members 21 and 22.

A switching member 31 is fixed to the operational feeling control apparatus 100 with screws 39*a* and 39*b*, and a switching operation unit 31*a* of the switching member 31 protrudes from an opening 10*c* of the exterior cover 10. When the switching operation unit 31*a* is slid to the left and right for the exterior cover 10, the operational feeling control apparatus 100 is also moved to the left and right for the exterior cover 10. At this time, the transmission member 53 is connected to either the transmission member 51 or the transmission member 52 depending on an operation on the switching operation unit 31*a*.

An operational feeling transmitter 50 includes the transmission members 51, 52, and 53. Connection portions 51*a*, 52*a*, and 53*a* are formed on outer peripheries of the transmission members 51, 52, and 53, respectively. Since the transmission member 53 is movable integrally with the rotation shaft portion of the operational feeling control apparatus 100, an operational feeling is directly transmitted from the operational feeling control apparatus 100 to the transmission member 53. When the transmission member 53 is connected to either the transmission member 51 or 52 depending on an operation on the switching operation unit 31*a*, the operational feeling of the operational feeling control apparatus 100 can be transmitted to the rotatable operation member 21 or 22 via the transmission member 51 or 52.

Figure 3A:
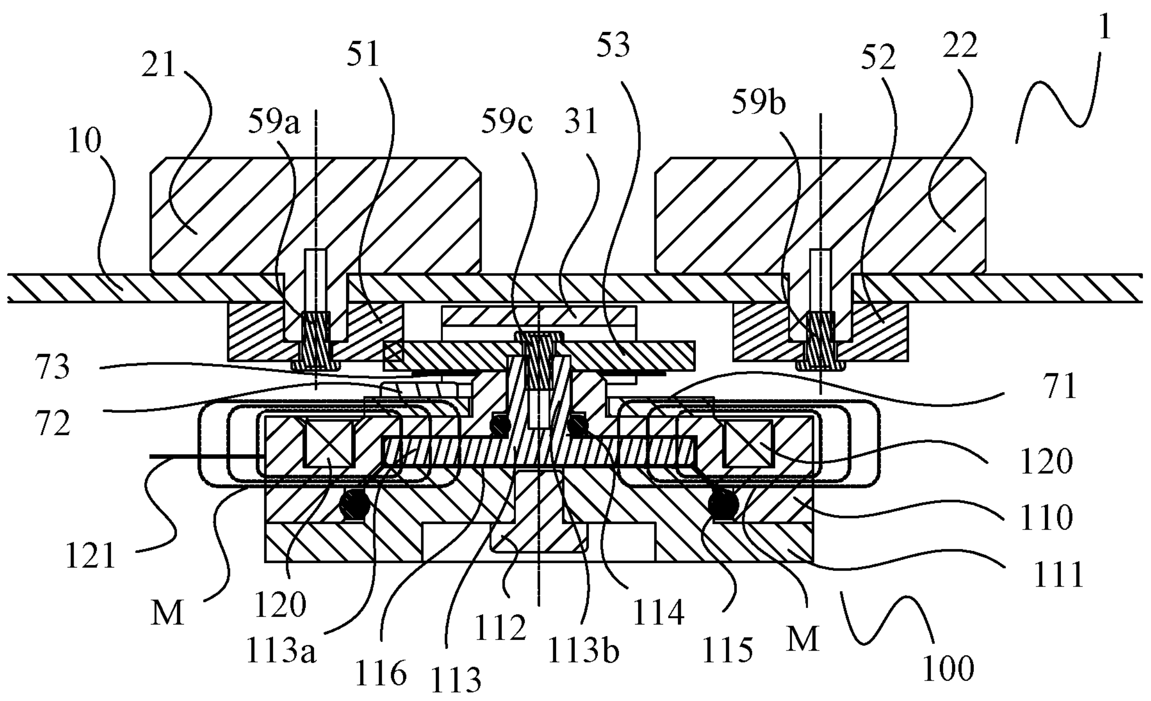
FIGS. 3A and 3B are detailed diagrams illustrating the operation unit of the electronic apparatus according to the first embodiment of the present disclosure.
Figure 3B:
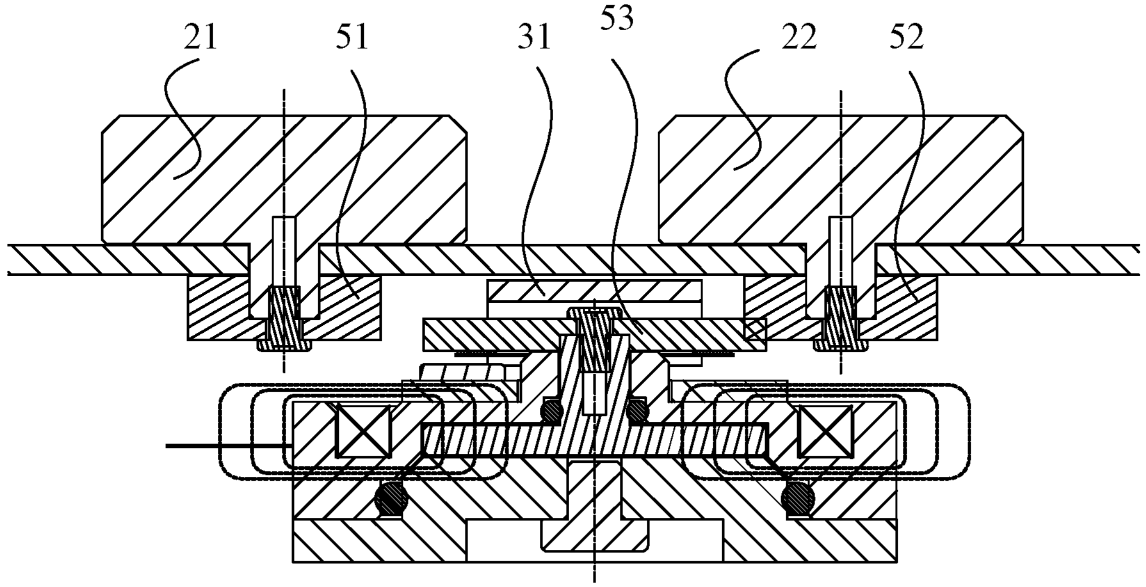

A detailed description will be given of the operation unit 1 and the operational feeling control apparatus 100 with reference to FIGS. 3A and 3B. FIG. 3A is a sectional view of the operation unit 1 indicated in FIG. 1B, and illustrates a state in which the switching operation unit 31*a* is slid in the direction of the rotatable operation member 21. FIG. 3B is a sectional view of the operation unit 1 indicated in FIG. 1B, and illustrates a state in which the switching operation unit 31*a* is slid in the direction of the rotatable operation member 22. FIGS. 3A and 3B illustrate basically the same configuration, and thus with reference to FIG. 3B, only the difference will be described and a detailed description will be omitted. A detailed description will be given of the operational feeling control apparatus 100 which uses an MR fluid 116. The main body of the operational feeling control apparatus 100 has an upper case 110 and a lower case 111, and includes a rotor 113 as a rotatable member which is rotatably supported. The rotor 113 includes a disc portion 113*a* and a shaft portion 113*b*. The transmission member 53 is fastened to the shaft portion 113*b* with the screw 59*c*. An O-ring 114 is disposed between the upper case 110 and the shaft portion 113*b*. An O-ring 115 is disposed between the upper case 110 and the lower case 111. In inside space surrounded by the upper case 110 and the lower case 111, a gap is formed around the disc portion 113*a* of the rotor 113. This gap is filled with the MR fluid 116. The O-rings 114 and 115 are disposed so that the O-rings 114 and 115 seal the operational feeling control apparatus 100 containing the MR fluid 116. By closing a hole in the lower case 111 with a lid member 112, the operational feeling control apparatus 100 containing the MR fluid 116 is completely sealed. A coil 120 as a magnetic field generator is disposed outside portion of the disc portion 113*a* and the upper case 110. Both ends 121 of the coil 120 are electrically connected to a circuit board (not illustrated). When a current flows through the coil 120, a magnetic field M is generated. When the MR fluid 116 filled around the disc portion 113*a* is affected by the magnetic field M, viscosity of the MR fluid 116 increases, and when the rotor 113 rotates, viscous resistance occurs between the disc portion 113*a* and the MR fluid 116. Further, when a value of the current flowing through the coil 120 increases and the magnetic field M becomes stronger, the viscosity of the MR fluid 116 also increases. That is, rotational torque of the rotor 113 can be changed by changing the value of the current flowing through the coil 120.

Figure 4:
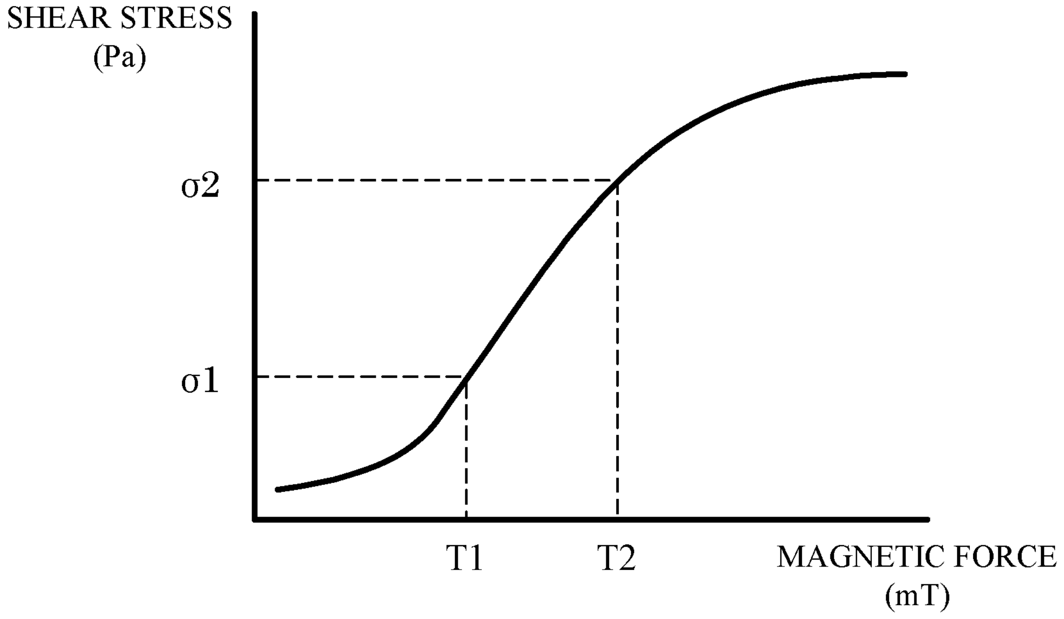
FIG. 4 is a diagram illustrating a relationship between a magnetic force applied to an MR fluid and a shear stress of the MR fluid.

FIG. 4 is a diagram illustrating a relationship between a magnetic force applied to the MR fluid 116 and a shear stress of the MR fluid 116. When the magnetic force is T1 at the time when a current flows through the coil 120, the shear stress of the MR fluid 116 is σ1. When the current flowing through the coil 120 is increased, a magnetic force T2 higher than the magnetic force T1 is generated, and the shear stress of the MR fluid 116 becomes σ2 higher than σ1.

Regarding a change in an operational feeling caused by the operational feeling control apparatus 100, when a constant current is continuously applied to the coil 120, the MR fluid 116 has constant viscosity, and thus the rotor 113 has constant rotational torque. On the other hand, when a current having varying current value of a square wave, a pulse wave, or the like flows through the coil 120, it is possible to acquire a change in torque when the rotor 113 is rotated. The varying current may be a time-varying change. Alternatively, the current value may be changed depending on the rotation angle of the transmission member 53 fed back from the detector 70, that is, the rotation angle of the rotatable operation members 21 and 22. As described above, by using the operational feeling control apparatus 100 using the MR fluid 116, it is possible to improve the operational feelings of the rotatable operation members 21 and 22.

When the transmission member 53 is connected to the transmission member 51 as illustrated in FIG. 3A, the operational feeling of the rotor 113 can be transmitted to the transmission member 51. That is, it is possible to transmit the operational feeling of the rotor 113 to the rotatable operation member 21. When the transmission member 53 is connected to the transmission member 52 as illustrated in FIG. 3B, the operational feeling of the rotor 113 can be transmitted to the transmission member 52. That is, it is possible to transmit the operational feeling of the rotor 113 to the rotatable operation member 22. The configuration of each of the transmission members 51, 52, and 53 may be, for example, a configuration like a spur gear. Alternatively, the configuration may be a configuration like a friction gear. The configuration thereof is not limited as long as the operational feeling can be transmitted.

Figure 5:
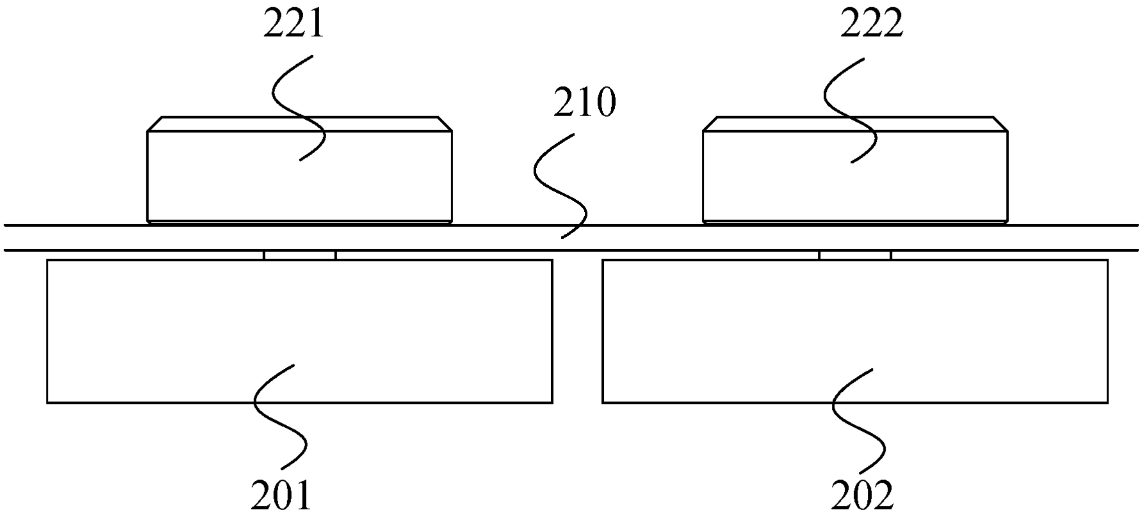
FIG. 5 is a diagram illustrating a conventional example.

FIG. 5 is a diagram illustrating a conventional configuration. Rotatable operation members 221 and 222 are arranged on an exterior cover 210. Operational feeling control apparatuses 201 and 202 are directly attached to respective rotatable operation members 221 and 222. In this case, the plurality of operational feeling control apparatus 201 and 202 are required, and therefore the size of the electronic apparatus becomes large. Further, the cost also increases. In this embodiment, only one operational feeling control apparatus 100 is used, the switching mechanism is provided, and the transmission state of the operational feeling transmitter 50 is changed so that the rotatable operation member to be used is selected. Thereby, it is possible to configure the plurality of rotatable operation members 21 and 22 having good operational feelings with a minimum cost and a minimum space.

As described above, according to the configuration of this embodiment, one operational feeling control apparatus 100 provides control on the plurality of rotatable operation members 21 and 22. Thereby, it is possible to provide a low-cost and small-sized electronic apparatus including the plurality of rotatable operation members 21 and 22 with good operational feelings.

Second Embodiment

Figure 6A:
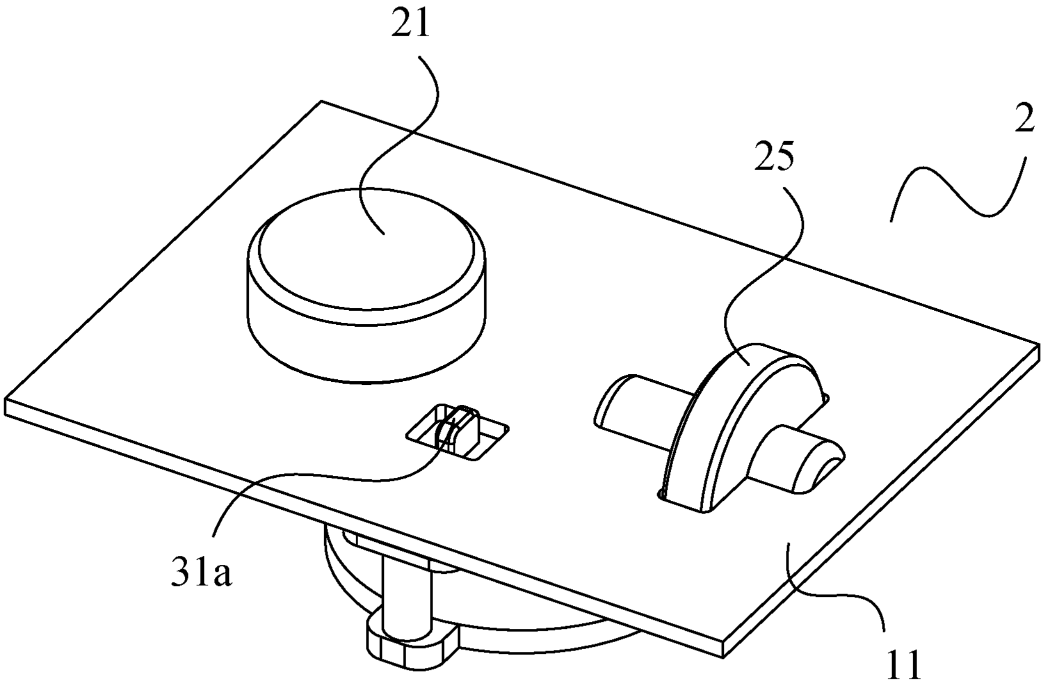
FIGS. 6A and 6B are perspective views illustrating an operation unit of an electronic apparatus according to the second embodiment of the present disclosure.

FIG. 6A is a perspective view illustrating an operation unit 2 including rotatable operation members 21 and 25 of an electronic apparatus according to the embodiment of the present disclosure. A description will be omitted of the same components as those in the first embodiment, and a detailed description will be given of different components from the first embodiment. Elements designated by the same reference numerals have the same functions.

The rotatable operation members 21 and 25 are disposed on an exterior cover 11. A rotational axis of the rotatable operation member 21 is orthogonal to the exterior cover 11. A rotational axis of the rotatable operation member 25 is parallel to the exterior cover 11. That is, the rotational axes of the rotatable operation members 21 and 25 are on different axes in different directions. A switching operation unit 31*a* protrudes from an opening 10*c* of the exterior cover 11, and can be slid in a direction of the rotatable operation member 21 or in a direction of the rotatable operation member 25. Regarding the exterior cover 11, a side surface and the like are omitted in the drawings for simplicity.

Figure 7:
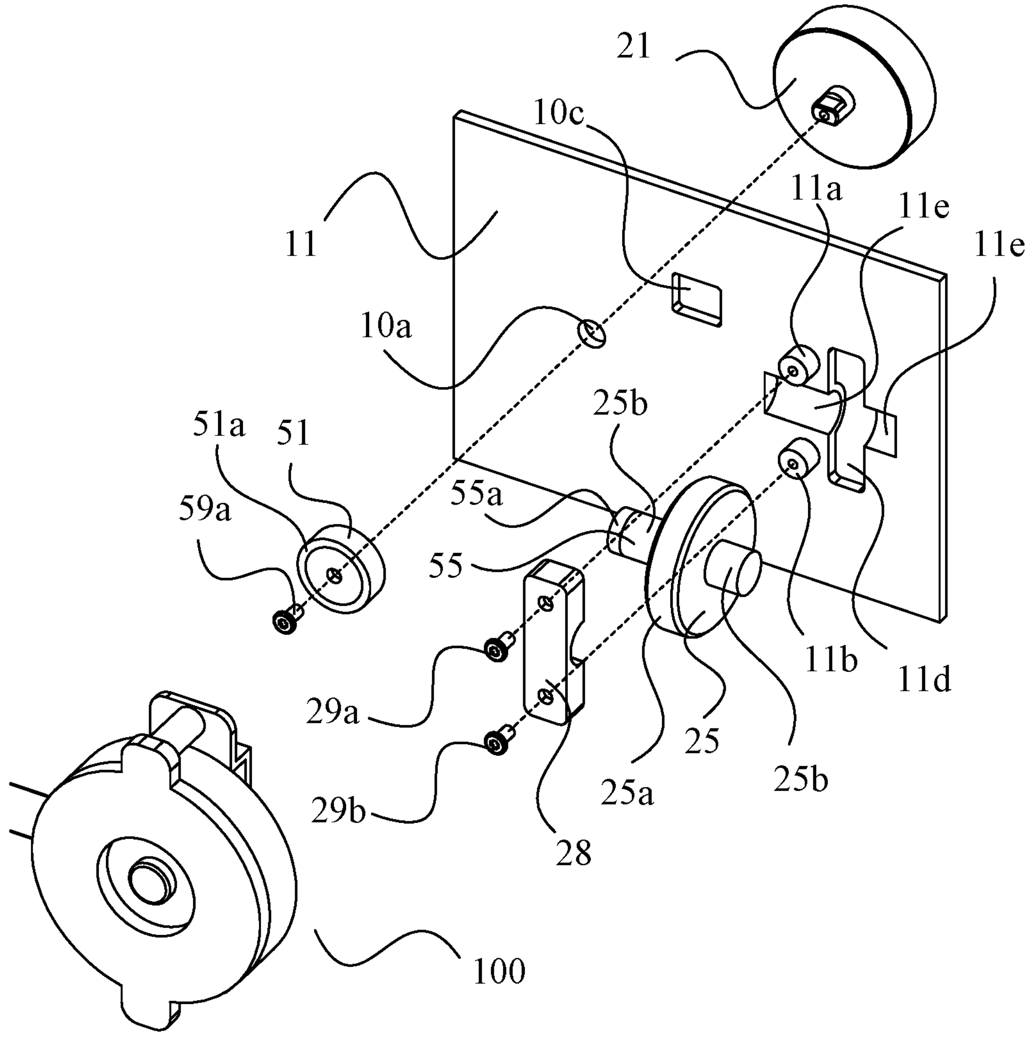
FIG. 7 is an exploded perspective view illustrating the operation unit of the electronic apparatus according to the second embodiment of the present disclosure.

FIG. 7 is an exploded perspective view illustrating an operation unit 2 as viewed from an inside of the exterior cover 11. A configuration of the operation unit 2 will be described with reference to the drawing. First, a description will be given of a peripheral configuration of the rotatable operation member 25, because a peripheral configuration of the rotatable operation member 21 is the same as that of the first embodiment. An opening 11*d* is formed on the exterior cover 11, and a groove 11*e* is formed inside the exterior cover 11. From the inside of the exterior cover 11, a shaft portion 25*b* of the rotatable operation member 25 is fitted into the groove 11*e*, and an outer peripheral surface 25*a* of the rotatable operation member 25 is projected from the opening 11*d*. The shaft portion 25*b* of the rotatable operation member 25 is covered with a holding member 28 from the inside of the exterior cover 11, and the holding member 28 is fastened to bosses 11*a* and 11*b*, which are formed inside the exterior cover 11, with screws 29*a* and 29*b*. The rotatable operation member 25 is supported rotatably for the exterior cover 11. A transmission member 55 is integrally formed on the shaft portion 25*b* of the rotatable operation member 25. A connection portion 55*a* is formed on the transmission member 55. In the second embodiment, the rotatable operation member 25 and the transmission member 55 are integrally formed, but they may be formed separately. Further, although the configuration around the rotatable operation member 25 has been described, the description is one example, and another configuration may be used as long as the rotatable operation member 25 is rotatably supported. As in the first embodiment, with the operational feeling control apparatus 100, a switching member 31, a transmission member 53, a detector 70, and the like are formed.

Figure 6B:
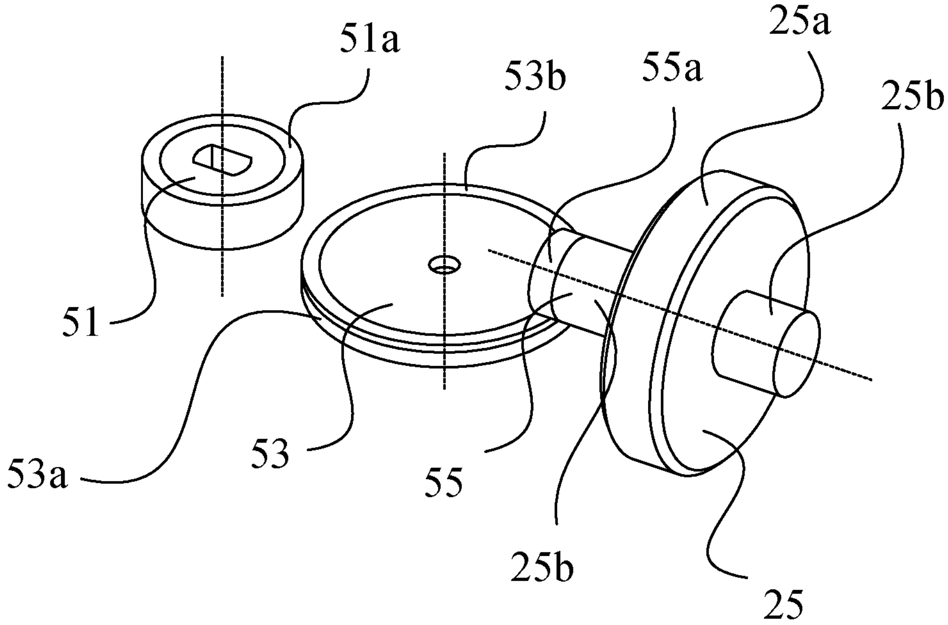

FIG. 6B is a perspective view illustrating an operational feeling transmitter 50 in FIG. 6A including transmission members 51 and 55 as sub transmission members and transmission member 53 as a main transmission member. A state is illustrated in which the switching operation unit 31*a* is slid in the direction of the rotatable operation member 25. Connection portions 51*a*, 53*a*, and 55*a* are formed on outer peripheries of the transmission members 51, 53, and 55, respectively. A connection portion 53*b* is further formed on an upper surface of the outer periphery of the transmission member 53. When the transmission members 51 and 53 whose rotational axes are in a same direction are connected, the connection portions 51*a* and 53*a* are connected. When the transmission members 53 and 55 whose rotational axes are orthogonal to each other are connected, the connection portions 53*b* and 55*a* are connected. A configuration of each of the connection portion 53*b* and the connection portion 55*a* may be, for example, a configuration like a bevel gear.

Alternatively, the configuration may be a configuration like a friction gear. The configuration is not limited as long as the operational feeling can be transmitted.

Along with the switching member 31, the operational feeling control apparatus 100 and the transmission member 53 also slide and move, and the transmission member 53 and the transmission member 55 are in the connected state, that is, the connection portion 53*b* of the transmission member 53 and the connection portion 55*a* of the transmission member 55 are connected. At this time, it is possible to change a direction of the rotational axis to another direction. That is, it is possible to control operational feelings of the plurality of rotatable operation members 21 and 25 having different rotational axes by using one operational feeling control apparatus 100.

In this embodiment, even if the rotatable operation members 21 and 25 have the rotational axes in different directions, only one operational feeling control apparatus 100 is used, the switching mechanism is provided, the transmission state of the operational feeling transmitter 50 is changed, and the rotatable operation member to be used is selected. Thereby, it is possible to configure the plurality of rotatable operation members 21 and 25 having good operational feelings with a minimum space and a minimum cost.

As described above, according to the configuration of this embodiment, one operational feeling control apparatus 100 provides control on the plurality of rotatable operation members 21 and 25. Thereby, it is possible to provide a low-cost and small-sized electronic apparatus including the plurality of rotatable operation members 21 and 25 with good operational feelings.

Third Embodiment

Figure 8A:
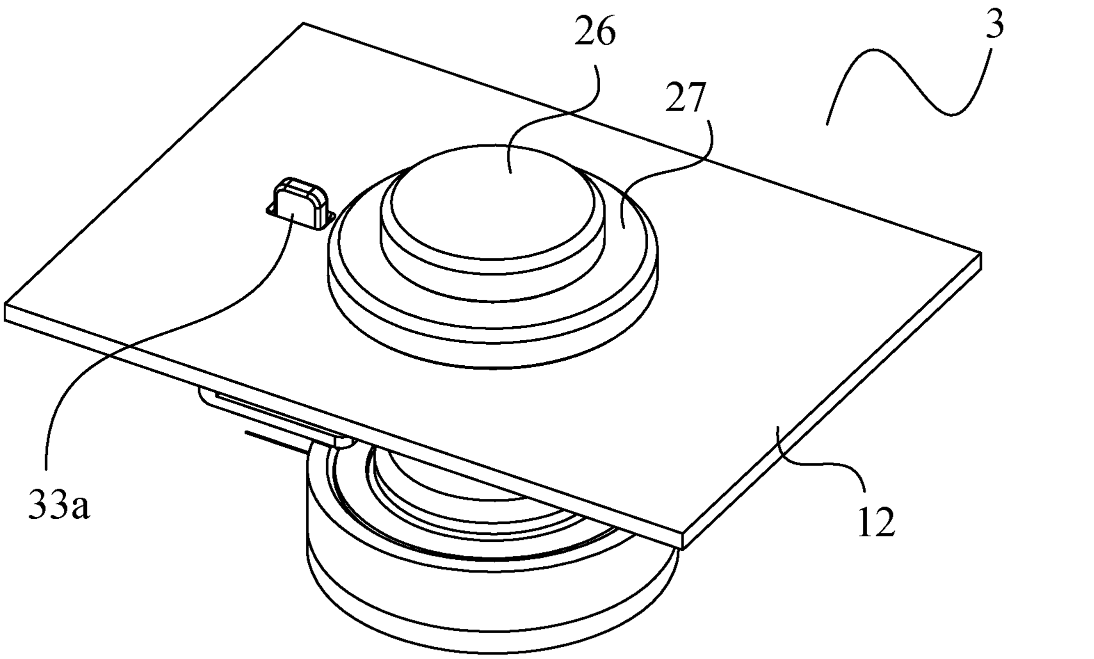
FIGS. 8A and 8B are a perspective view and a top view illustrating an operation unit of an electronic apparatus according to a third embodiment of the present disclosure.
Figure 8B:
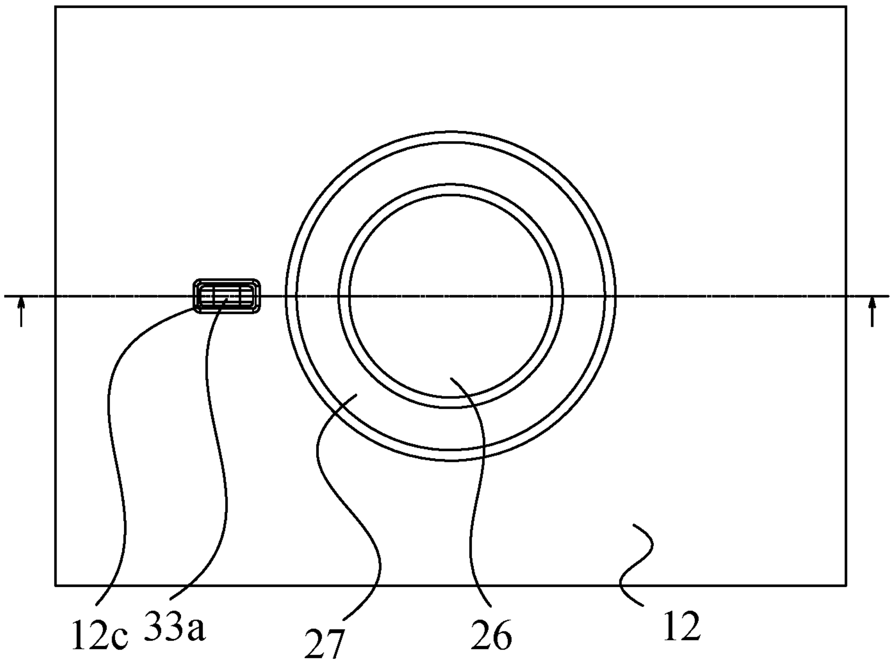

FIGS. 8A and 8B illustrate an operation unit 3 including rotatable operation members 26 and 27 of an electronic apparatus according to the embodiment of the present disclosure. FIG. 8A is a perspective view, and FIG. 8B is a top view. In this embodiment, a description will be given of a case where the operation unit 3 is disposed on an upper surface of the electronic apparatus, but in an actual electronic apparatus, the operation unit 3 may be disposed on any surface such as the other side surface or a back surface. A description will be omitted of the same components as those in the first embodiment, and a detailed description will be given of different components from the first embodiment. Elements designated by the same reference numerals have the same functions.

The rotatable operation members 26 and 27 are vertically arranged on the exterior cover 12. The rotational axes of the rotatable operation members 26 and 27 are both orthogonal to the exterior cover 12. That is, the rotational axes of the rotatable operation members 26 and 27 are on the same axis in the same direction. An opening 12*c* is formed on the exterior cover 12. A switching operation unit 33*a* protrudes from the opening 12*c*. Regarding the exterior cover 12, a side surface and the like are omitted in the drawings for simplicity.

Figure 9:
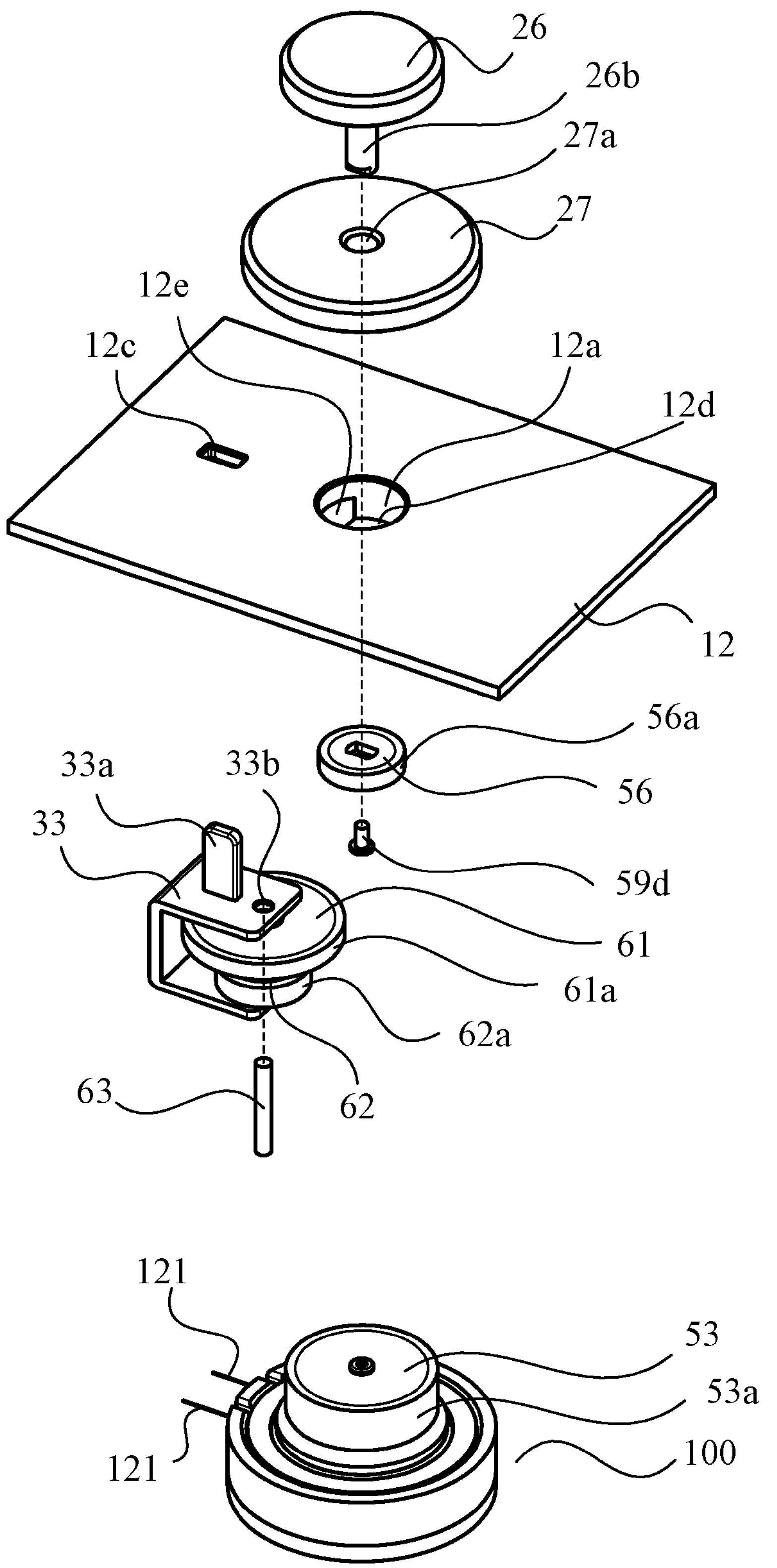
FIG. 9 is an exploded perspective view illustrating the operation unit of the electronic apparatus according to a third embodiment of the present disclosure.

FIG. 9 is an exploded perspective view illustrating the operation unit 3. A configuration of the operation unit 3 will be described with reference to FIG. 9. First, a peripheral configuration of the rotatable operation members 26 and 27 will be described. A circular concave portion 12*a* is formed on the outside of the exterior cover 12, and a circular opening 12*d* is provided on a bottom surface of the concave portion 12*a*. A shaft portion 27*b* of the rotatable operation member 27 is inserted into the concave portion 12*a* from the outside of the exterior cover 12. An opening 27*a* is formed on the rotatable operation member 27, and a shaft portion 26*b* of the rotatable operation member 26 is inserted from the outside of the exterior cover 12 into the opening 27*a* of the rotatable operation member 27 and the opening 12*d* of the exterior cover 12. From the inside of the exterior cover 12, a transmission member 56 is fitted to the shaft portion 26*b* of the rotatable operation member 26, and fastened with a screw 59*d*. The transmission member 56 is integrally movable with the rotatable operation member 26, and the rotatable operation member 26 is held rotatably for the exterior cover 12. The rotatable operation member 27 is held between the exterior cover 12 and the rotatable operation member 26, and is rotatable for the exterior cover 12.

Next, a description will be given of a switching mechanism of an operational feeling transmitter 50. In this embodiment, the operational feeling transmitter 50 includes transmission members 56 and 57 as sub transmission members, a transmission member 53 as a main transmission member, and intermediate members 61 and 62. A switching member 33 has a square U-shape, and on the switching member 33, the switching operation unit 33*a* is provided on an upper surface, and an opening 33*b* is formed on the upper surface and a lower surface. The switching operation unit 33*a* protrudes from the opening 12*c* of the exterior cover 12. On the intermediate members 61 and 62, connection portions 61*a* and 62*a* are formed on outer peripheries and circular opening 61*b* and 62*b* are formed at centers, respectively. The intermediate members 61 and 62 are arranged inside the square U-shape of the switching member 33, and a shaft 63 serving as rotational axes of the intermediate members 61 and 62 is inserted into the opening 33*b* of the switching member 33 and the openings 61*b* and 62*b* of the intermediate members 61 and 62. The shaft 63 and the intermediate members 61 and 62 are configured to be integrally movable by press fitting or the like, and are held rotatably for the switching member 33. Although the holding method is not illustrated, there are various methods such as a caulking configuration for the end of the shaft 63, and fixing both ends of the shaft with E-rings. The method is not limited as long as the shaft 63 and the intermediate members 61 and 62 are rotatably held. The structure around the operational feeling control apparatus 100 is the same as that of the first embodiment, and thus a description thereof will be omitted.

Figure 10A:
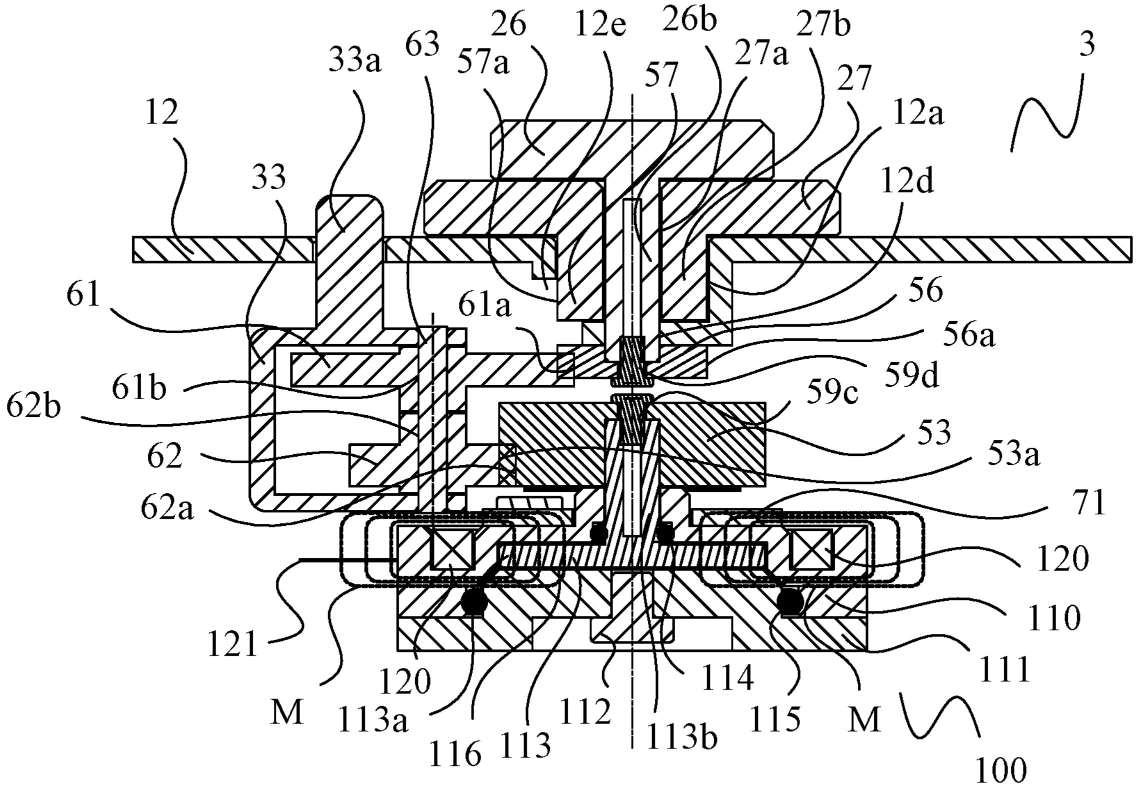
FIGS. 10A and 10B are detailed diagrams illustrating the operation unit of the electronic apparatus according to the third embodiment of the present disclosure.
Figure 10B:
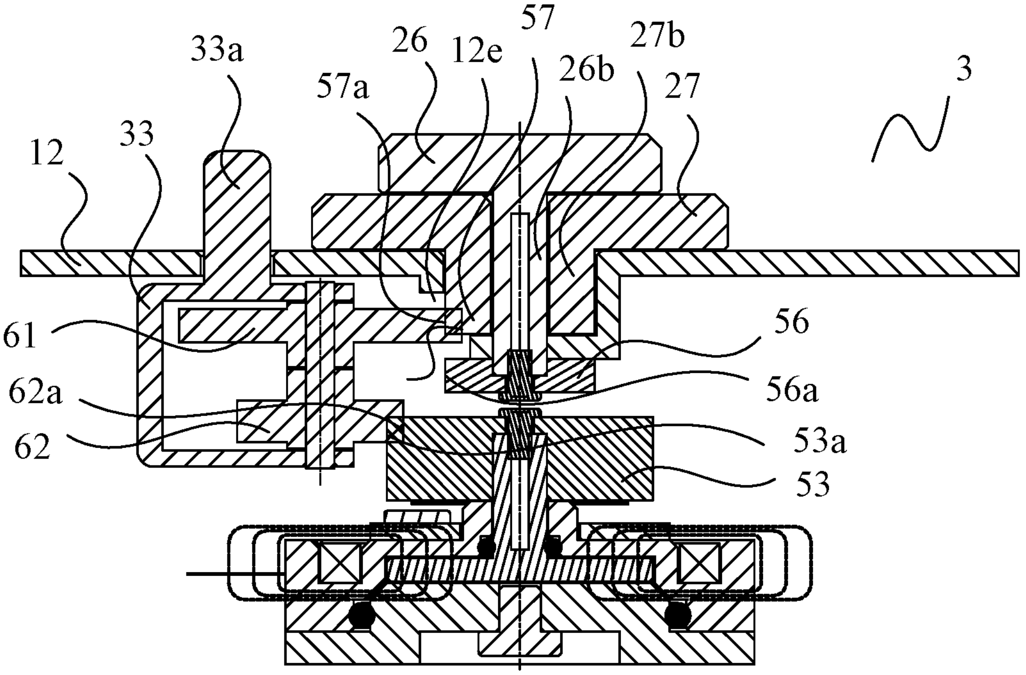

A detailed description will be given of the switching mechanism of the operational feeling transmitter 50 of the operation unit 3 with reference to FIGS. 10A and 10B. FIG. 10A is a sectional view of the operation unit 3 indicated in FIG. 8B, and illustrates a state in which the switching operation unit 33*a* is pressed into the exterior cover 12. FIG. 10B is a sectional view of the operation unit 3 indicated in FIG. 8B, and illustrates a state in which the switching operation unit 33*a* is pulled up from the exterior cover 12. FIGS. 10A and 10B have basically the same configuration, and thus regarding FIG. 10B, only the difference will be described and a detailed description will be omitted.

As illustrated in FIG. 10A, when the switching operation unit 33*a* is pressed into the exterior cover 12, the connection portion 62*a* of the intermediate member 62 is connected to the connection portion 53*a* of the transmission member 53 which transmits an operational feeling of the operational feeling control apparatus 100. The connection portion 61*a* of the intermediate member 61 which rotates integrally with the intermediate member 62 is connected to the connection portion 56*a* of the transmission member 56. Since the transmission member 56 rotates integrally with the rotatable operation member 26, the operational feeling of the rotatable operation member 26 is controlled. When the switching operation unit 33*a* is pulled up from the exterior cover 12 as illustrated in FIG. 10B, the intermediate member 62 is connected to the transmission member 53 which transmits the operational feeling of the operational feeling control apparatus 100, and the intermediate member 61 which rotates integrally with the intermediate member 62 is connected to the transmission member 57. A notch portion 12*e* is formed on the concave portion 12*a* of the exterior cover 12, and therefore the intermediate member 61 and the transmission member 57 can be connected to each other. Since the transmission member 57 is configured integrally with the shaft portion 27*b* of the rotatable operation member 27, the operational feeling of the rotatable operation member 27 is controlled. That is, unlike the first embodiment, the operational feeling control apparatus 100 is fixed, and when the intermediate member 61 is connected to either the transmission member 56 or 57 by moving the intermediate members 61 and 62 together with the switching member 33, it is possible to transmit the operational feeling of the operational feeling control apparatus 100 to the rotatable operation member 26 or 27 via the transmission member 56 or 57. A configuration of each of the transmission members 53, 56, and 57 and the intermediate members 61 and 62 may be, for example, a configuration like a spur gear. Alternatively, the configuration may be a configuration like a friction gear. The configuration is not limited as long as the operational feeling can be transmitted.

In the third embodiment, the intermediate members 61 and 62 have separate configurations, but they may be integrated. When the intermediate members 61 and 62 are integrally configured, it is not necessary to rotate integrally with the shaft 63, and thus it is not necessary to have a press-fitted configuration.

In this embodiment, only one operational feeling control apparatus 100 is used, the switching mechanism is provided, and the rotatable operation members to be used is selected by changing the transmission states of the operational feeling transmission members 53, 56, 57, 61, and 62. Thereby, it is possible to configure the plurality of rotatable operation members 26 and 27 having good operational feelings with a minimum space and a minimum cost.

As described above, according to the configuration of this embodiment, one operational feeling control apparatus 100 provides control on the plurality of rotatable operation members 26 and 27. Thereby, it is possible to provide a low-cost and small-sized electronic apparatus including the plurality of rotatable operation members 26 and 27 with good operational feelings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-111140, filed on Jun. 29, 2020 which is hereby incorporated by reference herein in its entirety.

What is claimed is:

1. An electronic apparatus comprising:

a control apparatus including:

a main body;

a rotatable member rotatably supported by the main body;

a magneto rheological fluid provided between the main body and the rotatable member; and a magnetic field generator configured to apply a magnetic field to the magneto rheological fluid;

a plurality of rotatable operation members; and an operational feeling transmitter configured to transmit an operational feeling of the control apparatus to the plurality of rotatable operation members, wherein when a switching member changes a transmission state of the operational feeling transmitter, a rotatable operation member to be used is selected from the plurality of rotatable operation members, and wherein the transmission state of the operational feeling transmitter is changed by moving the switching member.

2. The electronic apparatus according to claim 1, further comprising a detector configured to detect a rotation position and a rotation direction of the plurality of rotatable operation members or the operational feeling transmitter.

3. The electronic apparatus according to claim 1, wherein rotational axes of the plurality of rotatable operation members are on a same axis in a same direction.

4. The electronic apparatus according to claim 1, wherein the operational feeling transmitter includes:

a main transmission member which is rotatable integrally with the rotatable member;

a plurality of sub transmission members which are respectively provided for the plurality of rotatable operation members, and which are respectively rotatable integrally with the plurality of rotatable operation members; and an intermediate member which connects to the main transmission member.

5. An electronic apparatus comprising:

a control apparatus including:

a main body;

a rotatable member rotatably supported by the main body;

a magneto rheological fluid provided between the main body and the rotatable member; and a magnetic field generator configured to apply a magnetic field to the magneto rheological fluid;

a plurality of rotatable operation members; and an operational feeling transmitter configured to transmit an operational feeling of the control apparatus to the plurality of rotatable operation members, wherein when a switching member changes a transmission state of the operational feeling transmitter, a rotatable operation member to be used is selected from the plurality of rotatable operation members, and wherein rotational axes of the plurality of rotatable operation members are on different axes in a same direction.

6. An electronic apparatus comprising:

a control apparatus including:

a main body;

a rotatable member rotatably supported by the main body;

a magneto rheological fluid provided between the main body and the rotatable member; and a magnetic field generator configured to apply a magnetic field to the magneto rheological fluid;

a plurality of rotatable operation members; and an operational feeling transmitter configured to transmit an operational feeling of the control apparatus to the plurality of rotatable operation members, wherein when a switching member changes a transmission state of the operational feeling transmitter, a rotatable operation member to be used is selected from the plurality of rotatable operation members, and wherein rotational axes of the plurality of rotatable operation members are on different axes in different directions.

7. An electronic apparatus comprising:
a control apparatus including:
a main body;
a rotatable member rotatably supported by the main body;
a magneto rheological fluid provided between the main body and the rotatable member; and
a magnetic field generator configured to apply a magnetic field to the magneto rheological fluid;
a plurality of rotatable operation members; and
an operational feeling transmitter configured to transmit an operational feeling of the control apparatus to the plurality of rotatable operation members,
wherein when a switching member changes a transmission state of the operational feeling transmitter, a rotatable operation member to be used is selected from the plurality of rotatable operation members,
wherein the operational feeling transmitter includes:
a main transmission member which is rotatable integrally with the rotatable member; and
a plurality of sub transmission members which are respectively provided for the plurality of rotatable operation members, and which are respectively rotatable integrally with the plurality of rotatable operation members, and
wherein when the main transmission member moves so as to connect to one of the plurality of sub transmission members, the transmission state of the operational feeling transmitter is changed.

8. The electronic apparatus according to claim 7,
wherein when the switching member moves and causes the main transmission member to move so as to connect to one of the plurality of sub transmission members, the transmission state of the operational feeling transmitter is changed.

9. An electronic apparatus comprising:
a control apparatus including:
a main body;
a rotatable member rotatably supported by the main body;
a magneto rheological fluid provided between the main body and the rotatable member; and
a magnetic field generator configured to apply a magnetic field to the magneto rheological fluid;
a plurality of rotatable operation members; and
an operational feeling transmitter configured to transmit an operational feeling of the control apparatus to the plurality of rotatable operation members,
wherein when a switching member changes a transmission state of the operational feeling transmitter, a rotatable operation member to be used is selected from the plurality of rotatable operation members, and
wherein the operational feeling transmitter includes:
a main transmission member which is rotatable integrally with the rotatable member;
a plurality of sub transmission members which are respectively provided for the plurality of rotatable operation members, and which are respectively rotatable integrally with the plurality of rotatable operation members; and
an intermediate member which connects to the main transmission member, and
wherein when the intermediate member moves so as to connect to one of the plurality of sub transmission members, the transmission state of the operational feeling transmitter is changed.

10. The electronic apparatus according to claim 9,
wherein the intermediate member is fixedly disposed on the switching member, and
wherein when the switching member moves and causes the intermediate member to move so as to connect to one of the plurality of sub transmission members, the transmission state of the operational feeling transmitter is changed.

* * * * *